United States Patent [19]

Devall

[11] Patent Number: 5,188,436
[45] Date of Patent: Feb. 23, 1993

[54] LINEAR VARIABLE PRESSURE ADAPTIVE BRAKING AND TRACTION CONTROL SYSTEM

[75] Inventor: Jeffrey E. Devall, South Bend, Ind.

[73] Assignee: Allied-Signal Inc., Morris County, N.J.

[21] Appl. No.: 569,883

[22] Filed: Aug. 17, 1990

[51] Int. Cl.$^5$ .............................................. B60T 8/32
[52] U.S. Cl. .............................. 303/113.2; 137/625.65; 303/115.2; 303/116.2
[58] Field of Search ...... 303/113 R, 113 TB, 113 TR, 303/13, 14, 15, 117, 119 SV, 115 R, 115 EC, 115 PP, 110, 119 R, 110, 100, 84.1, 84.2, 116 R, 116 SP, 116 WP, 68-69; 137/625.65, 625.68, 625.67; 188/181 A

[56] References Cited

U.S. PATENT DOCUMENTS

| | | | |
|---|---|---|---|
| 4,596,273 | 6/1986 | Kiyoshima | 137/625.65 |
| 4,715,664 | 12/1987 | Nakanishi et al. | 303/111 |
| 4,741,580 | 5/1988 | Matsubara et al. | 303/105 |
| 4,741,581 | 5/1988 | Krohn | 303/115 |
| 4,755,008 | 7/1988 | Imoto et al. | 303/110 |
| 4,768,843 | 9/1988 | Baughman et al. | 303/119 |
| 4,778,226 | 10/1988 | Brown | 303/113 TR |
| 4,807,943 | 2/1989 | Ogino | 303/113 |
| 4,812,777 | 3/1989 | Shirai | 303/14 |
| 4,825,371 | 4/1989 | Hoashi et al. | 364/426.02 |
| 4,836,617 | 6/1989 | Resch | 303/100 |
| 4,838,620 | 6/1989 | Sypniewski | 303/116 |
| 4,840,434 | 6/1989 | Leiber | 303/15 X |
| 4,865,397 | 9/1989 | Inoue et al. | 303/110 |
| 4,902,075 | 2/1990 | Uno et al. | 303/14 |
| 4,940,291 | 7/1990 | Sato | 303/15 |
| 4,987,923 | 1/1991 | Tackett | 137/625.65 X |
| 5,002,091 | 3/1991 | Inokuchi | 137/625.65 |

FOREIGN PATENT DOCUMENTS

| | | |
|---|---|---|
| 355055 | 2/1990 | European Pat. Off. |
| 369412 | 5/1990 | European Pat. Off. |
| 2021185 | 5/1969 | Fed. Rep. of Germany |
| 8001783 | 9/1980 | PCT Int'l Appl. |
| 8901431 | 2/1989 | PCT Int'l Appl. |

*Primary Examiner*—Douglas C. Butler

[57] ABSTRACT

The linear variable pressure adaptive braking and traction control system (10) includes a control valve (70) having a linear actuator (72) and a valve (74). The linear actuator (72) may be operated to displace axially a valve member (82) of the valve (74) and which has a first valve seat (85) controlling fluid flow into a longitudinal passage (84) of the valve member (82). The first valve seat (85) engages a ball valve (101) disposed within an interior opening (97) of a slidable piston (90), the ball valve (101) biased by a resilient mechanism (102). The ball valve (101) also engages a piston valve seat (96) located at an end opening (94) of the piston (90). The piston (90) has a seal (92) thereabout and slides within a bore (76) of the valve (74). A spring mechanism (100) within the bore (76) biases the piston (90) toward an end (77) of the bore (76) having a passage (39) which communicates with a pump (50). An intermediate bore section (78) communicates with a passage (45) which connects the bore (76) with a wheel brake (20) via an electric valve mechanism (40). Another end (79) of the bore (76) includes a passage (55) which communicates the longitudinal passage (84) of the valve member (82) with a sump (58) that communicates with the pump (50). A vehicle master cylinder (30) communicates with the wheel brake (20) via the electric mechanism (90). The control valve (70) may be utilized to provide both adaptive braking and traction control system operation.

12 Claims, 2 Drawing Sheets

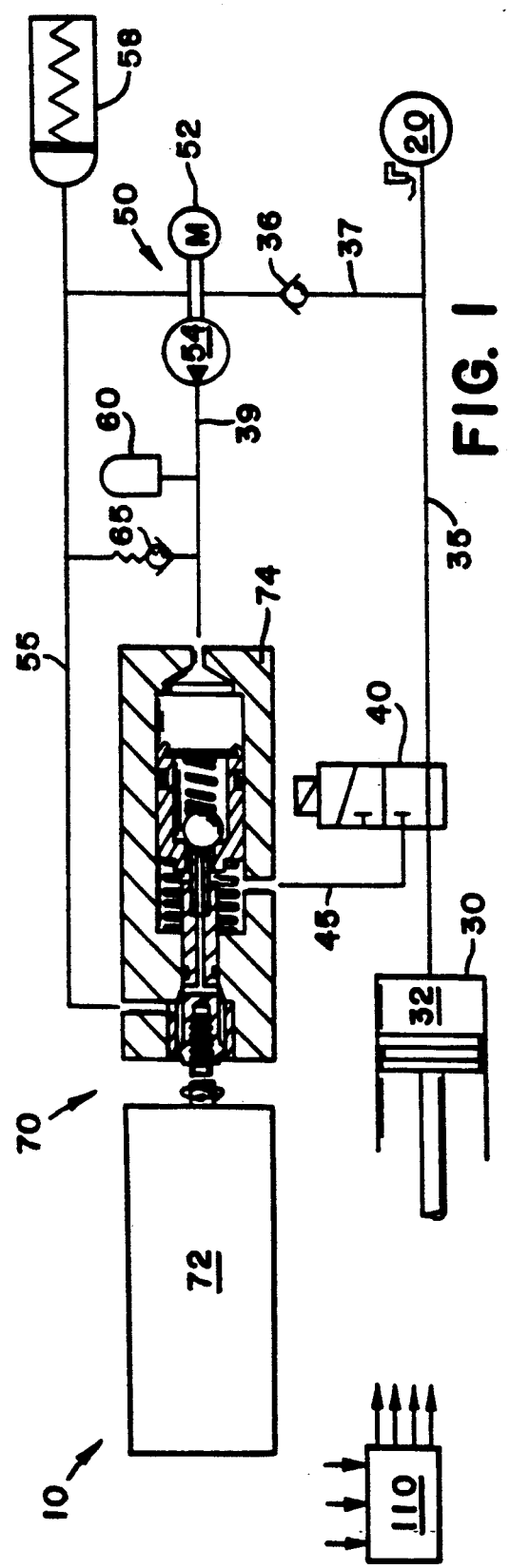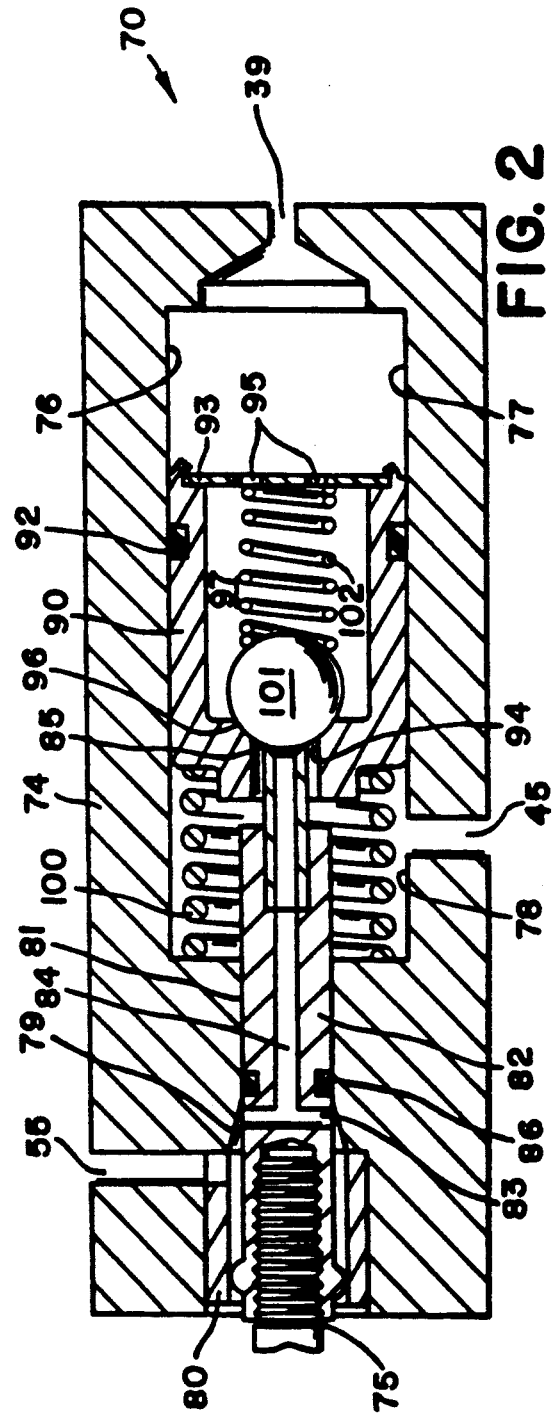

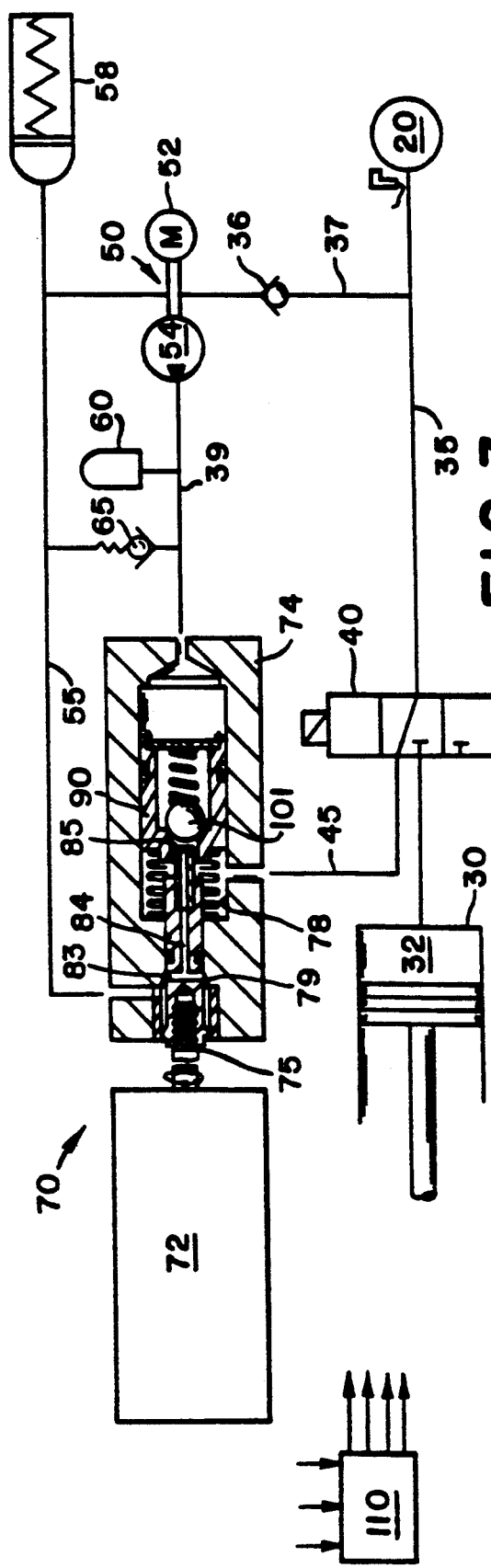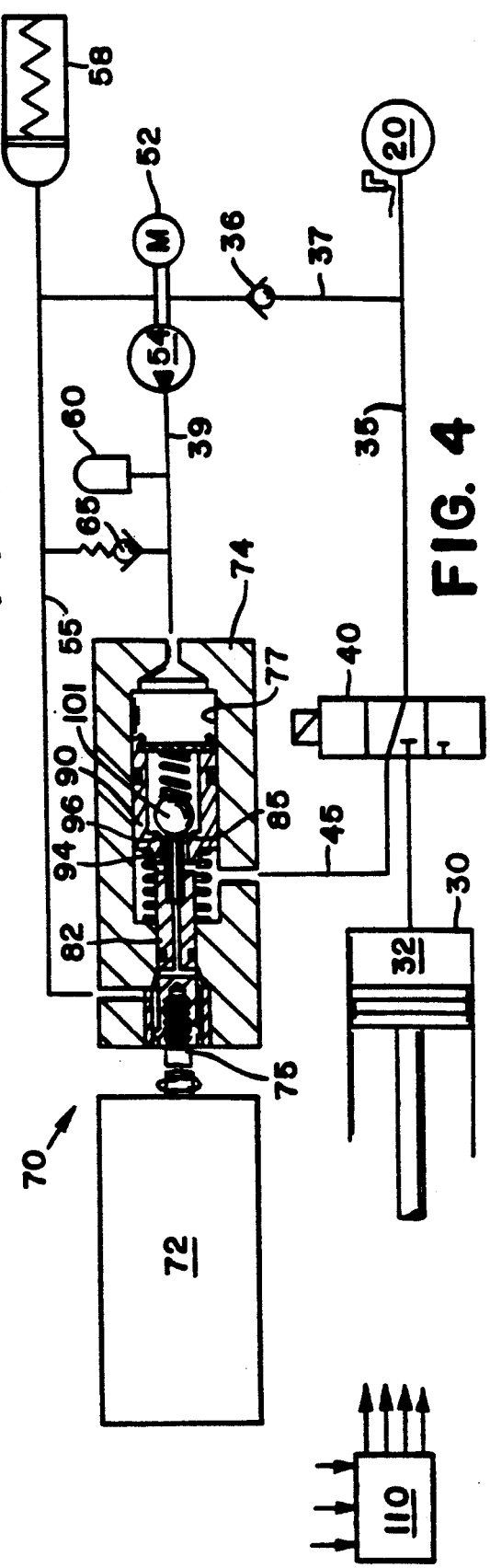

LINEAR VARIABLE PRESSURE ADAPTIVE BRAKING AND TRACTION CONTROL SYSTEM

The linear variable pressure adaptive braking and traction control system of the present invention relates generally to a control valve that provides adaptive braking and traction control functions for a vehicle, and in particular to a linear variable pressure control valve that provides such functions.

Adaptive braking systems have been utilized in vehicles. Traction control systems are now beginning to be utilized in vehicles, and primarily as an add-on feature to an adaptive braking system. Because traction control has been provided primarily as an add-on feature, it has been necessary to provide additional components such as solenoid valves, actuators, etc. for this function. It would be highly advantageous to provide an adaptive braking system which can be utilized both for adaptive braking and traction control. In order to accomplish this, it is necessary to provide an actuation device or devices that can be operated by the vehicle's electronic control unit to provide the desired function in the appropriate circumstances. By providing a braking control system that accomplishes the dual purposes of adaptive braking and traction control without the duplication of hardware or addition of extra hardware, the cost and complexity of the system can be reduced so that the traction control function is no longer an add-on feature of the control system.

The present invention provides solutions to the above problems by providing a linear variable pressure control valve, comprising a valve body having therein a bore, the bore communicating with first, second, and third passages in the valve body, a linearly operable and axially slidable valve member extending into said bore, the valve member having a longitudinal passage extending from a first valve seat at one valve end to a valve member opening within said valve member, the valve member opening communicating with said third passage, seal means disposed about said valve member in order to separate said third passage from said second passage, slidable piston means disposed within said bore and having a seal located thereabout, the seal and piston means separating said first passage from said second passage, the piston means having an interior opening communicating with a through end opening of the piston, valving means disposed within said interior opening and biased by resilient means into engagement with a piston valve seat which controls fluid flow through said end opening, the valving means engaging the first valve seat of the valve member to control fluid flow at said longitudinal passage, and spring means disposed within said bore and biasing said piston means toward said first passage, so that axial displacement of said valve member causes selectively one of a displacement of said valving means from said piston valve seat and a displacement of the first valve seat away from said valving means, and a fluid pressure differential within said bore able to cause said piston means to move slidably to effect one of said valve member moving said valving means away from said piston valve seat and said piston valve seat moving said valving means away from said first valve seat.

One way of carrying out the invention is described in detail below with reference to the drawings which illustrate an embodiment in which:

FIG. 1 is a schematic illustration of the control valve and adaptive braking and traction control system of the present invention;

FIG. 2 illustrates in detail a section view of the control valve of the present invention;

FIG. 3 is a schematic illustration of the system of FIG. 1 wherein braking pressure is being decayed away from the wheel brake; and FIG. 4 is a schematic illustration of the system of FIG. 1 wherein braking pressure is being built for the wheel brake.

The linear variable pressure adaptive braking and traction control system with control valve in accodance with the present invention is illustrated schematically in FIG. 1 and indicated generally by reference numeral 10. System 10 provides brake pressure build, hold and decay functions for both adaptive braking and traction control. System 10 comprises only a portion of a total adaptive braking and traction control system, with the additional parts being merely duplicates of some of the components of the system. For example, system 10 includes at least one wheel brake 20 which communicates with pressure chamber 32 of multiple chamber master cylinder 30 by means of a valving means or two-position, three-way isolation solenoid valve 40 and line connection 35. Wheel brake 20 also communicates with a linear variable pressure control valve 70 via solenoid valve 40 and second passage 45. System 10 includes one-way check valve 36 in line connection 37 which communicates with pump 50. Pump 50 includes motor 52 which drives one or more pumping sections 54 to provide increased fluid pressure to first passage 39. First passage 39 may include high pressure accumulator 60 and one-way check valve 65, check valve 65 also communicating with third passage 55. Third passage 55 comprises a return line communicating between control valve 70 and an inlet side of pump 50 via low pressure accumulator or sump 58. Depending on the type of system provided, high pressure accumulator 60 and check valve 65 may be optional. Control valve 70 comprises linear actuator 72 which is connected with and operates valve 74 to assist in varying fluid pressure communicated with valve 74. In a typical adaptive braking and traction control system, there would be four wheel brakes and an isolation solenoid valve 40 for each of the wheel brakes or, in a Y-split system, one isolation solenoid valve 40 for each of the front wheels and a single isolation solenoid valve for both of the rear wheel brakes. There would be a single pump motor with multiple pumping sections, one or more sumps depending on the plumbing of the system, and a linear variable pressure control valve 70 for each of the wheel brakes to be controlled (in a Y-split system, one control valve for both of the rear wheel brakes). Likewise, in a cross-split or X system, a single control valve 70 can be utilized to operate two diagonally opposed wheel brakes.

Referring to FIG. 2, control valve 70 is illustrated in detail wherein valve 74 includes a stepped bore 76 which communicates with third passage 55 at second bore end 79, with a second passage 45 at intermediate bore section 78, and with first passage 39 at first bore end 77. Bore 79 includes bearing sleeve 80 which houses axially moveable valve member 82. Linear actuator 72 (see FIG. 1) includes threaded shaft 75 which is threadably received within valve member 82. Valve member 82 includes valve member opening or transverse opening 83 which communicates with longitudinal passage 84 that terminates at first valve seat 85. Valve member 82 includes sealing mechanism 86 which engages reduced diameter bore section 81. Located within bore 76 is piston means 90 comprising a generally cup-shaped piston having seal 92 thereabout engaging sealingly the surface of bore 76. Piston means 90 includes through end opening 94 which receives valve member 82, and is biased by resilient means 100 toward first passage 39. An end member 93 is disposed over open end 94 of piston means 90, end member 93 having openings 95 which premit fluid to flow into interior opening 97. Valving means 101 comprises a ball valve that is biased by resilient means 102 against piston valve seat 96. Resilient means 102 also biases valving means 101 into engagement with first valve seat 85 of valve member 82.

During normal braking, pump 50 is not actuated unless the braking system is a full power system which utilizes the pump pressure for normal braking boost to the master cylinder. Solenoid valve 40 is not energized and this permits master cylinder 30 to transmit pressure via line connection 35 directly to wheel brake 20. The pressure communicated to the wheel brake is prevented from communicating with pump 50 by means of check valve 36. Axially extendable valve member 82 connected with linear actuator 72 is in a retracted position so that if the pump motor is operating pressure generated by the pump is trapped within first bore end 77 because valving means 101 seats on piston seat 96. Additionally, any fluid pressure emitted from control valve 70 would be prevented from communicating with wheel brake 20 by means of solenoid valve 40. Pressure generated by pump 50 returns to sump 58 and inlet line 38 by means of check valve 65 and return line 55.

Should control system 10 be activated by electronic control unit 110 which determines that a wheel skid is imminent, solenoid valve 40 is energized so that master cylinder 30 is isolated from wheel brake 20. Pump 50 is activated in order to provide build fluid pressure in preparation for reapplying the brakes once skidding is avoided. Pump 50 transmits fluid pressure to first bore end 77 but this pressure is prevented from communicating with second passage 45 by valving means 101 and piston valve seat 96. The energization of solenoid valve 40 connects wheel brake 20 with intermediate bore section 78. The high pressure at wheel brake 20 acts against the left side of piston means 90 to cause piston means 90 to translate to the right and separate valving means 101 from first valve seat 85 so that fluid pressure communicated via second passage 45 is decayed to sump 58 and the inlet side of pump 50 by way of longitudinal passage 84, valve member opening or transverse passage 83, second bore end 79, and third passage 55 (see FIG. 3). Should the pressure transmitted to intermediate bore section 78 not be sufficient to move piston means 90 and valving means 101 away from first valve seat 85, the linear actuator will operate to retract a bit further and move first valve seat 85 away from valving means 101.

During the decay phase of the adaptive braking cycle just described, it is desirable to increase the wheel brake pressure to create effective braking when it is determined that the wheel is no longer skidding. During this build phase, valving means or solenoid valve 40 remains energized and pump 50 continues to operate. Control valve 70 is either still decaying wheel brake pressure to third passage 55 or valve member 82 has come to rest against valving means 101 as piston means 90 translates to the left as a result of reduced pressure within intermediate bore section 78. To reapply the brakes, linear actuator 72 is energized so that threaded shaft 75 rotates and extends axially valve member 82 to lift valving means 101 away from piston valve seat 96. This permits fluid pressure communicated from pump 50 to first bore end 77 to be transmitted through end opening 94 and to second passage 45 for transmittal to wheel brake 20 (see FIG. 4).

During the operation of adaptive braking system 10, it may be determined by electronic control unit 110 that the pressure at the wheel brake should be maintained at a present pressure level. To accomplish this, linear actuator 72 ceases operation and a buildup of pressure within intermediate bore section 78 causes piston means 90 to translate to the right so that piston seat 96 engages valving means 101. Should this cause valving means 101 to be lifted off first valve seat 85, then pressure within intermediate bore section 78 is permitted to decay to third passage 55. Control valve 70 will come to essentially an equilibrium position so that either both of valve seats 85 and 96 are closed or if any pressure bleeds through the valve seats the pressure will be in such a small amount that it will have a negligible affect.

If system 10 is to be operated in order to provide traction control, the system will operate in essentially the same way as described for the build, decay and hold functions of the adaptive braking system. If during an acceleration of the vehicle a vehicle wheel is determined to be spinning excessively, pump 50 is energized (if it is not already operating) to build pressure to apply braking to the spinning wheel. Solenoid valve 40 is activated in order to connect wheel brake 20 with control valve 70. The linear actuator operates to extend axially valve member 82 and displace valving means 101 away from piston valve seat 96 so that fluid pressure from pump 50 will be communicated with second passage 45 and solenoid valve 40 (FIG. 4). This build function of the traction control system is the same operation as provided for the build function of the adaptive braking system. Likewise, the decay and hold functions of the traction control system are the same as the decay and hold functions of the adaptive braking system operation.

When the adaptive braking or traction control system terminates operation, linear actuator 72 returns to its retracted position so that valve member 82 is retracted. Pump 50 is deactivated, unless it is a full power system. The valving means or solenoid valve 40 is deneergized so that master cylinder 30 is again connected with wheel brake 20 for normal braking operation. Pressure within return line 55 and sump 58 is permitted to normalize with the master cylinder pressure (should the master cylinder pressure be lower than the return pressure) by means of one-way check valve 36. System 10 will have been returned to its original non-braking mode with the exception being that there will be some residual pressure both in first bore end 77 and intermediate bore section 78. This pressure should not last long because perfect sealing between these portions of bore 76 by means of seal 92 around piston 90 is unlikely. The presence of pressure within first bore end 77 and intermediate bore section 78 is not adverse to the operation of braking system 10 for normal braking.

A major advantage of the present invention is that it provides a means for varying the build and decay wheel brake pressure rates such that the transition rate between pressures is not fixed, as occurs with fixed orifices, but can be controlled actively by the ECU effecting variation of the actuator speed.

What is claimed is:

1. A linear variable pressure control valve, comprising a valve body having therein a bore, the bore communicating with first, second, and third passages in the valve body, a linearly operable and axially slidable valve member extending into said bore, the valve member having a longitudinal passage extending from a first valve seat at one valve end to a valve member opening within said valve member, the valve member opening communicating with said third passage, seal means disposed about said valve member in order to separate said third passage from said second passage, slidable piston means disposed within said bore and having a seal located thereabout, the seal and piston means separating said first passage from said second passage, the piston means having an interior opening communicating with a through end opening of the piston means, valving means disposed within said interior opening and biased by resilient means into engagement with a piston valve seat which controls fluid flow through said end opening, the valving means engaging the first valve seat of the valve member to control fluid flow at said longitudinal passage, and spring means disposed within said bore and biasing said piston means toward said first passage, so that axial displacement of said valve member causes selectively one of a displacement of said valving means from said piston valve seat and a displacement of the first valve seat away from said valving means, and a fluid pressure differential within said bore able to cause said piston means to move slidably to effect one of said valve member moving said valving means away from said piston valve seat and said piston valve seat moving said valving means away from said first valve seat.

2. The control valve in accordance with claim 1, wherein the valve member is connected with a linear actuator which displaces axially the valve member.

3. The control valve in accordance with claim 1, wherein the valve member extends within said end opening of the piston means in order to engage the first valve seat with said valving means.

4. The control valve in accordance with claim 1, wherein the valve member opening of said valve member comprises a transverse opening.

5. The control valve in accordance with claim 1, wherein said piston means comprises a generally cup-shaped piston having an end member providing a seat for said resilient means.

6. The control valve in accordance with claim 5, wherein the end member comprises a plurality of end openings which permit fluid flow therethrough.

7. The control valve in accordance with claim 1, wherein the valving means comprises a ball valve which engages said piston valve seat to control fluid flow through said end opening and engages said first valve seat to control fluid flow through said longitudinal passage.

8. The control valve of claim 1 in combination with an adaptive braking and traction control system, wherein the first passage communicates with pump means, the second passage communicates with a wheel brake via electric valving means, and the third passage communicates with sump means that communicates with said pump means.

9. The control valve and adaptive braking and traction control system in accordance with claim 8, further comprising master cylinder means which communicates with said wheel brake via said electric valving means.

10. The control valve and adaptive braking and traction control system in accordance with claim 8, further comprising high pressure accumulator means and check valve means which communicate with the first passage and are located between said bore and pump means.

11. The control valve and adaptive braking and traction control system in accordance with claim 10, wherein said check valve means is disposed in a line connecting said third passage with said first passage.

12. The control valve and adaptive braking and traction control system in accordance with claim 11, wherein said check valve means prevents fluid flow through the line in a direction from the third passage to the first passage.

* * * * *